United States Patent Office 2,814,980
Patented Dec. 3, 1957

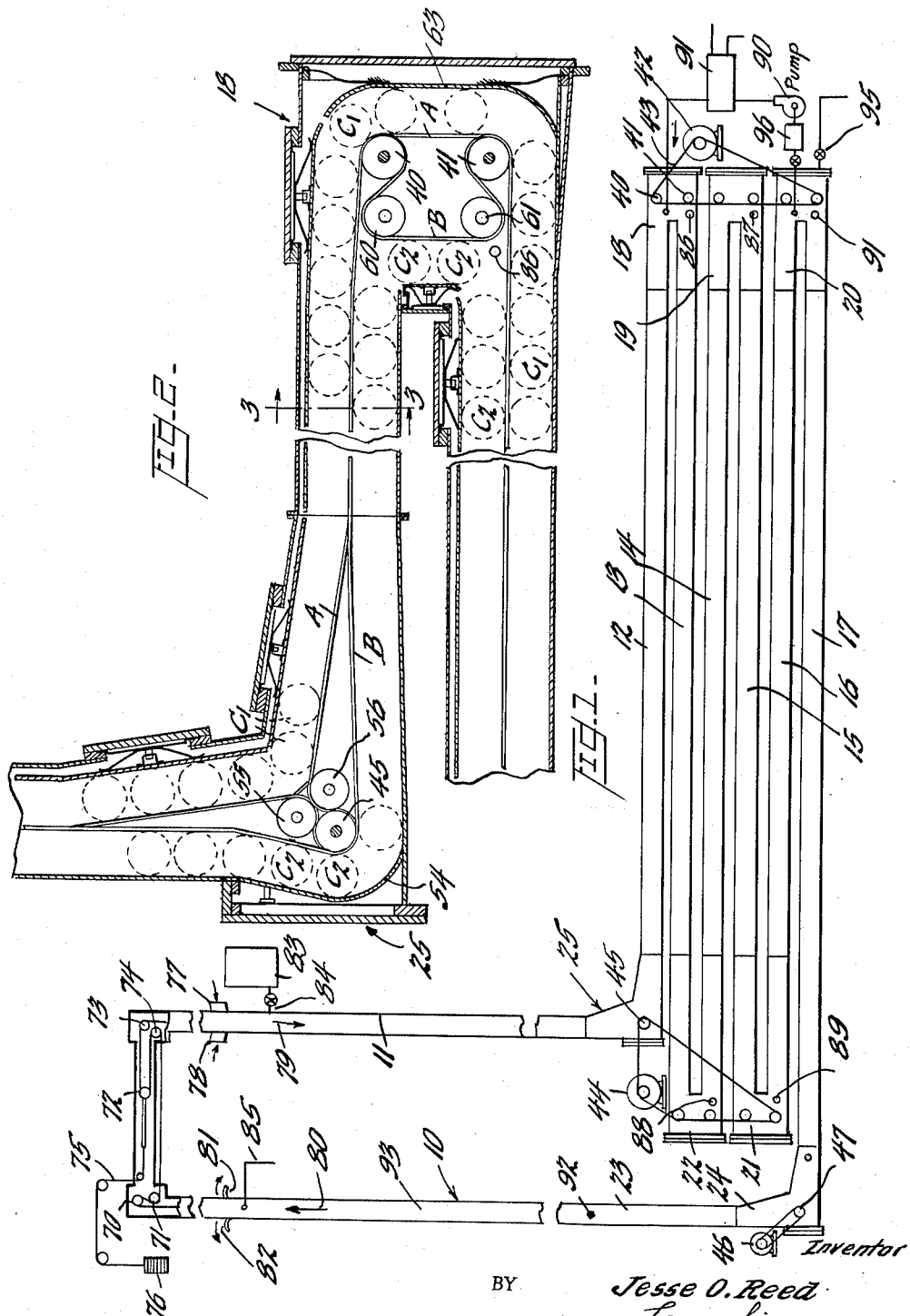

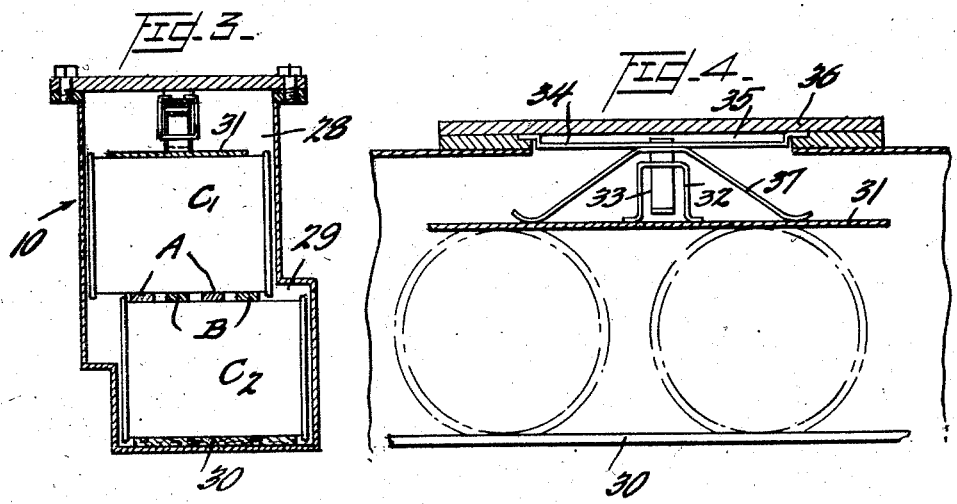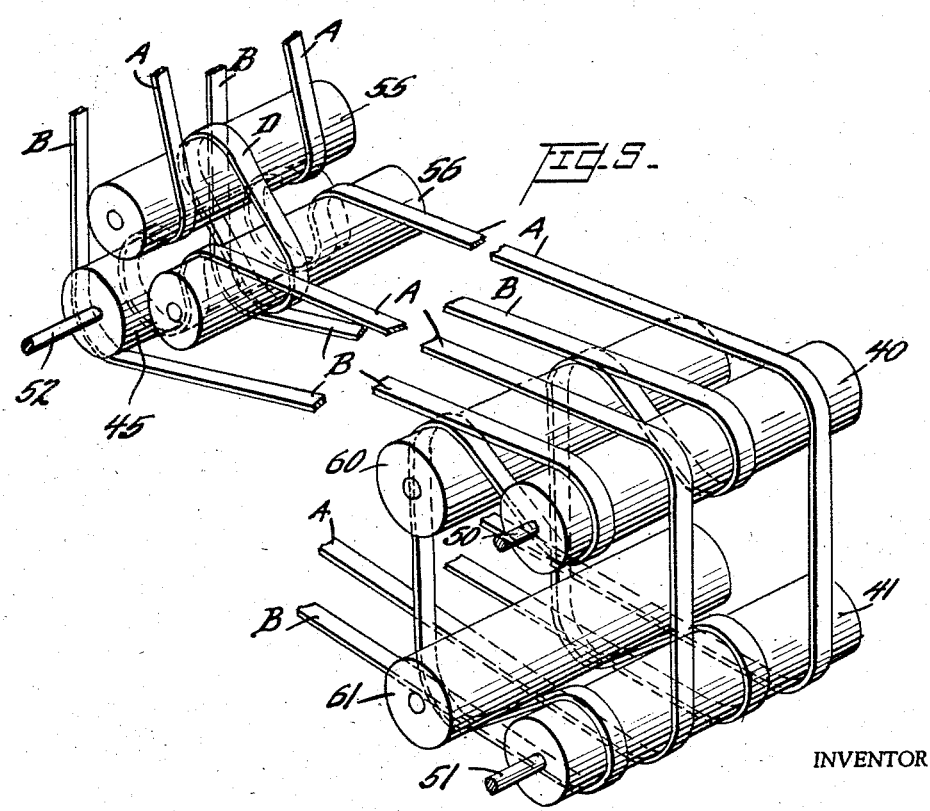

2,814,980

APPARATUS FOR HEAT PROCESSING AND CONVEYING OF CANNED MATERIALS

Jesse O. Reed, Washington, D. C.

Application June 6, 1955, Serial No. 513,395

6 Claims. (Cl. 99—362)

The present invention relates to a novel apparatus for conveying and heat processing canned materials.

More particularly, the present invention relates to a novel apparatus which is capable of rapidly conveying and otherwise treating loaded cans so that these cans can be quickly and efficiently processed for the preservation of the contents thereof.

In my United States application Serial Number 232,334, filed June 19, 1951, now United States Patent Number 2,710,260, issued June 7, 1955, there is disclosed and claimed a novel process for canning food products in cans which comprises continuously rotating the cans along a closed liquid-filled path in a downward direction under continuously increasing pressures of a liquid head, while heating the liquid to a proper temperature, and thereafter cooling the liquid in the path and reversing the direction of the movement of the cans so that the cans are rolled in an upward direction.

The process disclosed in the aforementioned prior application is a substantial improvement on the usual method of processing food products in sealed cans since it does not involve the necessity of heating and cooling of large retorts and maintaining these retorts under regulated pressure for the period of time required for obtaining a satisfactory product. The present application is a continuation-in-part of the aforementioned prior application and is directed primarily to a novel apparatus which is in part disclosed in the aforementioned prior application.

It is an object of the present invention therefore to provide a novel apparatus for the conveying and processing of cans filled with food and the like which will be economical to operate and which will provide for rotation and agitation of canned contents during processing.

A second object of the present invention is to provide a novel conveyor system for cans or the like wherein the motive power for moving the cans is provided by continuous flexible belt and wherein the cans themselves, at least in part, furnish moving members for the support of the moving belt.

A third object of the present invention is to provide a novel apparatus for canning food products or the like which includes a continuous conduit of a size to permit passage of a pair of cans together with a flexible belt threaded through said conduit and supported between the cans so that when the belt is driven a rolling movement of the cans along the conduit will take place.

Still another object of the present invention is to provide in a novel apparatus for canning food products or the like a continuous conduit including means for conveying cans through the conduit, this conduit having a relatively long portion extending downwardly, a substantially horizontal sinuous portion and a relatively long portion extending upwardly so that cans may be continuously processed and heated in the sinuous portion while being subjected to rotational movement, the relatively long vertical portions serving to maintain the liquid head within the sinuous relatively horizontal portion.

Another object of the present invention is to provide novel means including means to separate the driving belts for the cans being conveyed through the apparatus of the present invention whereby to facilitate the movement of the cans about the bands in the system.

Another object of the present invention is to provide a novel conveying means for cans through a system of the character described including means to impose a pressure on at least one of the cans whereby the cans are forced into firm contact with a moving belt which serves to convey and rotate said cans.

Other objects and advantages of the present invention will become apparent from a subsequent description and figures of the drawing wherein:

Fig. 1 is a diagrammatic view of the canning apparatus of the present invention.

Fig. 2 is an enlarged section of a portion of the canning apparatus illustrating on a larger scale the bends in the conduits thereof.

Fig. 3 is a section taken along the lines 3—3 of Fig. 2 and illustrating the off-set nature of portions of the conduit.

Fig. 4 is a sectional detail of a portion of one of the pressure members or plates.

Fig. 5 is a perspective view of the arrangement of driving belts or pulleys for conveying and rotating cans about the bends in the apparatus.

Referring to the drawings, and particularly Fig. 1 thereof, a conduit for the conveying of cans is indicated generally at 10. The conduit 10 includes a downwardly extending portion 11, a generally horizontally extending portion constituted by the straight tubes 12, 13, 14, 15 and 16 and 17 connected respectively by the elbow or bend portions 18, 19, 20, 21 and 22. The conduit 10 also includes a generally vertically upwardly extending portion 23 connected to the horizontal tube portion 17 by the elbow or bend portion 24. A similar elbow or bend portion 25 connects the downward vertical portion of the conduit 11 with the horizontal tube 12.

As best shown in Fig. 3, the conduit 10 is formed from sheet metal preferably bent to provide a pair of off-set portions 28 and 29. The purpose of these off-set portions is to receive and guide each can of a pair of cans indicated at C-1 and C-2, the can C-1 fitting into the off-set portion 28 and the can C-2 fitting into off-set portion 29. Threaded continuously through the conduit 10 are a plurality of belts A and B, which are generally positioned at a point intermediate the two off-set portions 28 and 29. As best shown in Fig. 3, the belts A are generally responsible for the movement and rotation of the cans indicated at C-1, and the belts B for the rotation and movement of the cans indicated at C-2.

As shown in Fig. 3, during the straight horizontal run or vertical runs of the conduit 10, the belts A and B are each positioned between the cans and are staggered so that they are centrally located between the flanges of the cans C-1 and C-2. It will be noted further that there is provided a plate 30 at the lower end of the conduit 10, as shown in Fig. 3, which serves to guide the flanges of the can C-2. The can C-2 is forced against the belts A and B by the pressure plate 31 which is provided with an upper link member 32 threaded through and having a limited movement within the bracket 33 supported by the strap 34 in the opening 35 at the upper part of the conduit 10. A cover plate 36 is also provided so that the opening 35 may be uncovered for examination of the conduit interior. Also supported on the strap 34 is a spring member 37 which urges the pressure plate 31 downwardly against the can C-1 which in turn is thus forced into firm contact with the belts A and B and the belts in turn into contact with the can C-2. This provision of a plurality of belts, such as the pair of belts A and pair of belts B, enables the cans to be separated and readily moved around corners in the conduit system as best shown in Figs. 2 and 5. Fig. 2 discloses in some detail the complete return bend 18 and the elbow or bend 25. It will be noted that there is located within the bend 18 a pair of drive pulleys or rolls 40 and 41. Similar drive pulleys are located within the return bends 19 and 20 as indicated diagrammatically in Fig. 1 and all of these drive pulleys are rotated by the motor 42 through the drive belt 43. A similar motor 44 drives a single drive pulley 45 located within the bend 25 as well as the pulleys within the return bends 21 and 22. Still another motor driven synchronously with that described and indicated at 46 serves to drive a single drive pulley 47 within the return bend 24. In each case of course the various drive pulleys or rolls are driven through appropriate shafts such as the shafts 50 and 51, extending through the drive rolls or pulleys 40 and 41, and the shaft 52 extending through the drive roll or pulley 45. It will be noted that in the bend 25 the belts B are simply trained about the drive roller 45 and the cans are held between the belt B and a pressure plate of curved structure indicated at 54. The belts A however in addition to being trained about the drive roller 45 are also trained about the idler rollers 55 and 56; this arrangement being necessitated by the fact that the can C–1 and the belt A travel about the inner part of the bend. Preferably, there is also provided as best shown in Fig. 5 an idler belt D which helps to drive the can C–1 about the curve. A similar arrangement is of course provided in the return bend 24. The only driven element of this arrangement is the drive pulley 47 indicated diagrammatically in Fig. 1. It will be noted that in the return bends such as the bend 18 a somewhat different arrangement is provided in that the cans C–1 travel about the outside of the curve. The belts A then are trained directly about the drive rolls 40 and 41 which are in turn driven by the drive shafts 50 and 51 as shown in Fig. 5. The belts B are trained about the rolls 40 and 41 and then extend inwardly so that they are trained about the idler rolls 60 and 61, the belts B being trained first about the drive roll 40 and then about the upper side of the drive roll 60, then the lower side of the drive roll 61 and finally about the upper side of the drive roll 41 and around to rejoin the belts A. It will be noted that a pressure plate 62 is provided to urge the can C–2 against the belts B and another pressure plate 63 to urge the can C–1 against the belts A. The roll 41 is off-set slightly downwardly so that there will be a positive drive or tension against the end can.

Referring to Fig. 1, it will be noted that all of the belts A and B are continuously positioned in the conduits and at the upper end of the conduit structure are wound about a plurality of pulleys or rolls 70, 71, 72, 73 and 74. The roll 70 is preferably also driven by a motor in synchronism with the motors 42, 44 and 46. The pulleys 72, 73 and 74 function as a part of a belt tightening system. In other words, the pulley 72 is mounted in a slide and is urged by the cable 75 in a left direction. The cable 75 is of course tensioned by the weight 76. Cans are fed into the system to each side of the belts A and B through the ports 77 and 78 at the upper end of the conduit leg 11. The cans therefore move through the conduit system in the direction of the arrow 79, i. e. downwardly down leg 11 to the right along horizontal leg 12 the left along horizontal leg 13 etc. and finally upward along the vertical leg 23 as indicated by the arrow 80. The cans are finally discharged through the ports 81 and 82. The entire system is filled with water and is kept at a constant level through the balance tank 83 connected to the upper end of the leg 11 by the pipe 84. This also serves as a water discharge for surplus water. Another discharge for cooling water is also provided, being indicated by the reference numeral 85, i. e. the path of the water in the legs 23 and 11 is upward in both instances, since a surplus of water is being added in the form of steam as hereinafter set forth as well as in the form of cooling water elsewhere in the system. It may be noted that the water in the surge tank 83 is warm in character and that the water in the leg 11 which has a generally upward flow is also of warm character. Steam for heating purposes is fed into the system through the ports indicated at 86 and 87. Other ports may also be provided along the conduits 13, 14, 15, or 16 but in general in any event, there should be provided steam ports 88 and 89 as well. Due to the surplus water introduced thus in the form of steam, the water flow in the conduit 12 is to the left and up the leg 11. This section therefore functions as a preheating section for the cans, the cans becoming successively warmer as they move downwardly down conduit 11 and to the right along conduit 12. The conduits 13, 14, 15 and 16 function as the true treatment or heating or cooking section and a recirculation of the heating fluid within these sections to promote uniform temperature is provided by the pump 90 which removes hot water from the end of the conduit 16 and reintroduces this hot water at the right hand end of the conduit 12, i. e. in the return section 18. A heat exchanger 91 is provided principally for warming the water for the start of the process prior to the introduction of live steam through the ports 86, 87 and so forth. Since a substantial proportion of the hot water is being moved through the pump 90 at the end of the horizontal section 16, cold water may be introduced through the port indicated at 91. Preferably, this first introduction of cold water is at an intermediate temperature. Further amounts of cold water may then be introduced along the conduit 17 which functions as a preliminary cooling section and along the return conduit 23, as for example through the ports 92 and 93. The surplus of the cold water leaves the system as previously indicated through the pipe 85. A blow-off valve is also provided as indicated at 95 and a filter at 96.

*Operation*

Referring specifically to Fig. 1, will be noted that the height of the vertical legs 11 and 23 will be such that a suitable temperature and pressure will be maintained upon the cans of food stuffs to be cooked and sterilized. For example, for a temperature of 250° F. the height will be of the order of 35 feet. Obviously, as the cans move downwardly in portion 11 and the rest of the system they are subjected to an increasing pressure or liquid head corresponding to the portion of the total height of the system involved and as they move upwardly in portion 23 a lesser and lesser pressure is exerted thereupon. In operating the device, the entire apparatus or conduit 10 is first filled with water as by utilizing the cold water inlet pipe as well as operating the heat exchanger 91. Steam is then turned on in the steam inlets 86 and 87 to further heat the water to the desired temperature, as for example 250° F. The various motors are then started and the belts are moved through the system at the desired speed. Cans are then fed in through the ports 77 and 78 and as they move downwardly through the system they meet the upward flow of warm water and become gradually heated. When they reach the end of the conduit 12, they are heated approximately to the desired temperature and the treatment is continued for a period of time depending upon the speed of the belts and length of the conduits 13, 14, 15 and 16. Thereafter the cans are subjected to the action of cold water or medium cold water entering through the port 91 and as they move to the left along the conduit 17, they are gradually submitted to lower and lower temperatures. This process is continued as the cans move upwardly along the return leg 23 at a decreasing pressure. When the cans are discharged through the ports 81 and 82 they are completely processed.

It will be noted that the hot water moves in countercurrent to the cans as they enter the system and as they proceed toward the true heating zone which is generally at approximately the proper pressure and temperature. During the passage through the heating zone proper, constituted by the conduits 13, 14, 15 and 16, the water flows along with the cans as they move but is constantly recirculated as by the pump 90 so that a uniform temperature is achieved. As the cans move along the cooling part of the system, i. e. the conduit 17, the bend 24 and the upward leg 23, the cooling water moves along with the cans. As the cans are moved they are also rotated by the action of the belts on their periphery so that the cans themselves act to partially support the belts between the various pulleys.

I claim:

1. An apparatus for canning food products and the like in cans which comprises a continuous conduit of a size to permit passage of a pair of cans, a flexible belt member threaded through said conduit and supported between and by said cans, means for driving said belt member to cause rolling movement of said cans along said conduit and means to supply a heating medium to one portion of said conduit and a cooling medium to an adjacent portion thereof.

2. An apparatus for canning food products and the like in cans which comprises a continuous conduit of a size to permit passage of a pair of cans, flexible belt members supported between and by spaced pairs of cans, means to drive said belt members to cause rolling movement of said cans along said conduit, said conduit having a relatively long portion extending downwardly, a substantially horizontal portion and a relatively long upwardly extending portion, said downward and upward portions of said conduit being of a sufficient length to maintain a liquid head in the horizontal portion, means to heat a part of said horizontal portion and means to cool a second part of said horizontal portion.

3. An apparatus for canning food products and the like in cans which comprises a continuous conduit provided with bend portions of a size to permit passage of a pair of cans, a plurality of belt members threaded through said conduit, means to support said belt members in an intermediate position in said conduit by and between said pair of cans, means to drive said belt members to cause rolling movement of cans along said conduit and means to separate certain of said belts to separately drive each can of a pair along said bend portions.

4. An apparatus for canning food products and the like in cans which comprises a continuous conduit provided with bend portions of a size to permit passage of a pair of cans, a plurality of belt members threaded through said conduit, means to support said belt members in an intermediate position in said conduit by and between said pair of cans, means to drive said belt members to cause rolling movement of cans along said conduit, means to separate certain of said belts to separately driven each can of a pair along said bend portions, means to supply a heating medium to one portion of said conduit and a cooling medium to an adjacent portion thereof.

5. An apparatus for canning food products and the like in cans which comprises a continuous conduit of a size to permit passage of a pair of cans, said conduit having a pair of portions, one of said portions being transversely offset relative to the other so as to define a separate path of movement for each respective can of a pair, a flexible belt member threaded through said conduit and supported by said cans between said cans and portions, means for driving said belt member to cause rolling movement of said cans along said conduit and means to supply a heating medium to one portion of said conduit and a cooling medium to an adjacent portion thereof.

6. An apparatus for canning food products and the like in cans which comprises a continuous conduit of a size to permit passage of a pair of cans, a flexible belt member threaded through said conduit and supported between and by said cans, means for driving said belt member to cause rolling movement of said cans along said conduit, means to supply a heating medium to one portion of said conduit and a cooling medium to an adjacent portion thereof and means to exert pressure on at least one of the cans of a pair to insure firm driving contact between said belt and cans.

References Cited in the file of this patent

UNITED STATES PATENTS

| | | |
|---|---|---|
| 1,062,379 | Anderson et al. | May 20, 1913 |
| 1,446,955 | Wilcox | Feb. 27, 1923 |
| 1,987,414 | Omsted | Jan. 8, 1935 |
| 2,695,555 | Carvallo | Nov. 30, 1954 |